United States Patent
Oberheide et al.

(10) Patent No.: US 7,476,022 B2
(45) Date of Patent: Jan. 13, 2009

(54) MEASUREMENT OF MOTOR TEMPERATURE USING A DIGITAL ENCODER

(75) Inventors: G. Clarke Oberheide, Troy, MI (US); Bruce R. Cluney, Aurora (CA)

(73) Assignee: Magna Closures Inc., Newmarket, Ontario (CA)

( * ) Notice: Subject to any disclaimer, the term of this patent is extended or adjusted under 35 U.S.C. 154(b) by 81 days.

(21) Appl. No.: 11/521,821

(22) Filed: Sep. 15, 2006
(Under 37 CFR 1.47)

(65) Prior Publication Data

US 2007/0121703 A1 May 31, 2007

Related U.S. Application Data

(60) Provisional application No. 60/717,491, filed on Sep. 15, 2005.

(51) Int. Cl.
*G01K 7/00* (2006.01)
(52) U.S. Cl. .................... 374/163; 374/100; 374/141
(58) Field of Classification Search .............. 335/6, 335/43–44, 217, 220–221; 310/315, 346, 310/16–24, 68 C, 21–22, 25–29, 31–32, 323.08; 374/163, 141
See application file for complete search history.

(56) References Cited

U.S. PATENT DOCUMENTS

| | | | | |
|---|---|---|---|---|
| 4,051,420 A * | 9/1977 | Tanikoshi | ............ | 318/400.08 |
| 4,150,358 A | 4/1979 | Aviander | | |
| 4,634,961 A * | 1/1987 | Popovic et al. | ............ | 323/368 |
| 4,646,014 A * | 2/1987 | Eulenberg | ............ | 324/251 |
| 4,721,894 A | 1/1988 | Graber | | |
| 4,857,842 A * | 8/1989 | Sturman et al. | ............ | 324/225 |
| 5,488,296 A * | 1/1996 | Hancock | ............ | 324/251 |
| 5,686,827 A * | 11/1997 | Ward | ............ | 323/368 |
| 6,262,574 B1 | 7/2001 | Cho et al. | | |
| 6,504,358 B1 | 1/2003 | Maier et al. | | |
| 6,522,094 B1 | 2/2003 | Griesemer et al. | | |
| 6,661,195 B1 | 12/2003 | Schmidt et al. | | |
| 6,707,293 B2 * | 3/2004 | Wan et al. | ............ | 324/207.25 |
| 6,806,669 B2 | 10/2004 | Griesemer et al. | | |
| 6,949,945 B2 | 9/2005 | Klein | | |
| 2002/0003409 A1* | 1/2002 | Brown et al. | ............ | 318/254 |
| 2003/0221674 A1 | 12/2003 | Scanderberg et al. | | |
| 2006/0047480 A1* | 3/2006 | Lenz et al. | ............ | 702/183 |
| 2006/0279244 A1* | 12/2006 | Rutkowski et al. | ............ | 318/471 |
| 2008/0030188 A1* | 2/2008 | Ponziani et al. | ............ | 324/207.2 |

FOREIGN PATENT DOCUMENTS

DE    103 12 685 A1    10/2003

* cited by examiner

*Primary Examiner*—Edward Lefkowitz
*Assistant Examiner*—Bret Adams
(74) *Attorney, Agent, or Firm*—Clark Hill PLC

(57) ABSTRACT

A temperature sensing assembly for a motor having an armature includes a Hall Effect sensor disposed adjacent the armature. The Hall Effect sensor senses rotation of the armature. The Hall Effect sensor includes an electrical output and generates a stepped output signal. The temperature sensing assembly also includes a thermistor connected to the electrical output in series therewith. The temperature sensing assembly also includes a pull-up resistor electrically connected to the thermistor, a voltage source and a signal output such that the stepped output signal changes depending on the temperature of the motor due to changes in the resistivity of the thermistor as is changes its resistivity as a function of temperature.

7 Claims, 3 Drawing Sheets

US 7,476,022 B2

MEASUREMENT OF MOTOR TEMPERATURE USING A DIGITAL ENCODER

BACKGROUND ART

1. Field of the Invention

The invention relates to temperature sensor devices for motors. More particularly, the invention relates to a temperature sensor for a motor having a simplified structure.

2. Description of the Related Art

Motors are used to power actuators that drive such things as power windows and power lift gates in motor vehicles. With the advent of low cost microprocessor controls, motors often contain Hall Effect encoders to deliver speed and positional information to an electronic controller. A Hall Effect signal is a digital square wave corresponding exactly to the motor's rotational movement, having alternating high ($V_H$) and low ($V_L$) logic levels. From this Hall Effect signal, identifying the exact speed and rotational position of the motor can be determined.

Motors used in similar actuators also often require thermal protection to protect the motors from abuse and overload conditions. Motors may include discreet internal devices to interrupt current in case internal temperatures reach dangerous levels for the integrity of the motor. Both solid state and bi-metal devices are available. Such devices carry motor currents directly and are generally large, costly, and can be imprecise to a temperature limit. Such devices, in series with motor currents, introduce undesirable voltage drops, critical in low voltage applications such as automotive powered battery systems.

Referring to FIGS. 1A and 1B, a Hall Effect sensor uses an internal transistor to amplify the Hall Effect and generate a digital signal. The transistor is an open collector transistor and switches between open and close conditions to ground generating a wave form signal to the controller through a series resistor or a pull-up resistor. When the transistor is off, the signal level is high; and, when the transistor is conducting, a current flow causes voltage to be dropped across the pull-up resistor creating the low signal level. FIG. 1B illustrates the output of this device.

Referring to FIGS. 2A and 2B, certain Hall Effect applications use an internal resistor in conjunction with the pull-up resistor so that only two wires are necessary to connect to the Hall Effect sensor. The signal generated by the Hall Effect sensor is transmitted on the power feed wiring by using an intermediate voltage for the low logic level. With this, the Hall Effect sensor is continuously powered by the low and high logic levels.

SUMMARY OF THE INVENTION

A temperature sensing assembly for a motor having an armature includes a Hall Effect sensor is disposed adjacent the armature. The Hall Effect sensor senses rotation of the armature. The Hall Effect sensor includes an electrical output and generates a stepped output signal. The temperature sensing assembly also includes a thermistor connected to the electrical output in series therewith. The temperature sensing assembly also includes a pull-up resistor electrically connected to the thermistor, a voltage source and a signal output. The temperature sensing assembly is electrically connected this way to produce a varied output such that the stepped output signal changes depending on the temperature of the motor due to changes in the resistivity of the thermistor as is changes its resistivity as a function of temperature.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1A:
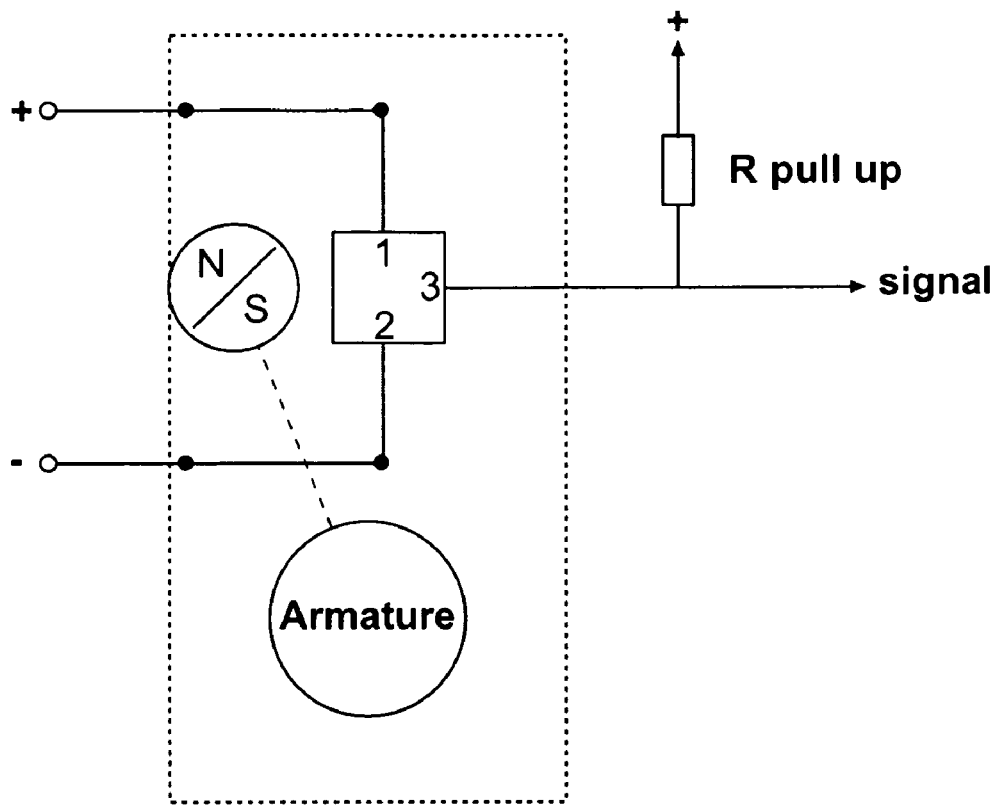
FIG. 1A is a schematic view of a Hall Effect sensor of the related art.
Figure 1B:
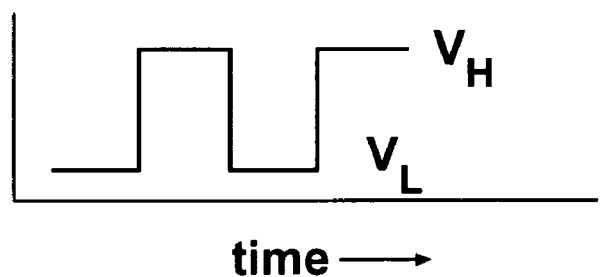
FIG. 1B is an output of the electrical system shown in FIG. 1A.
Figure 2A:
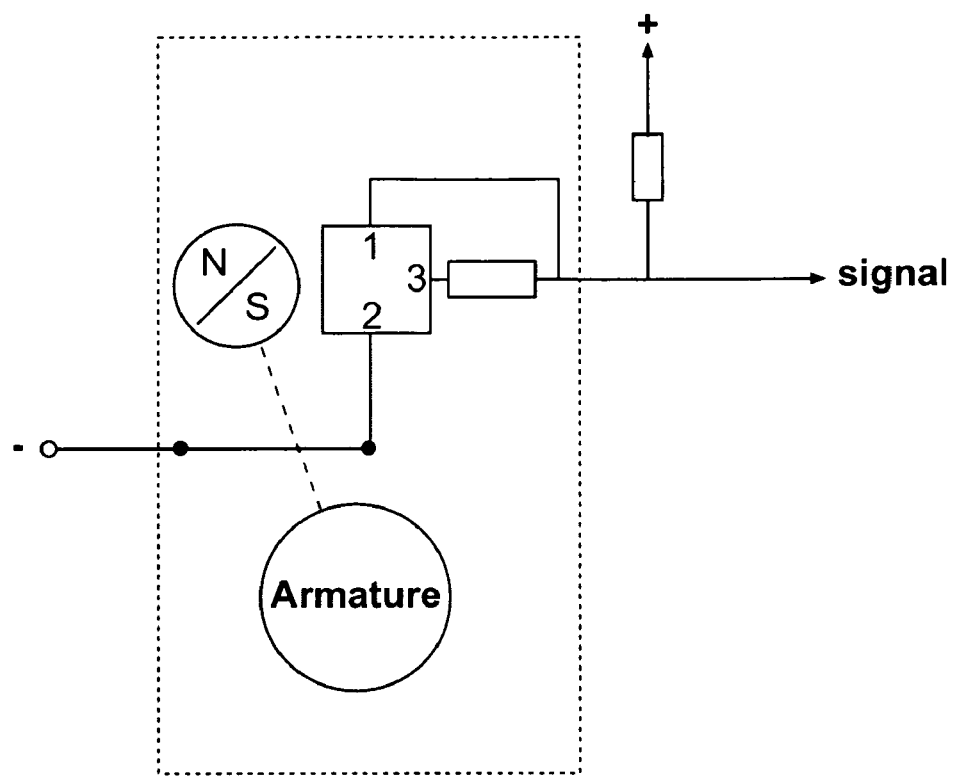
FIG. 2A is second embodiment of a Hall Effect sensor utilized in the related art.
Figure 2B:
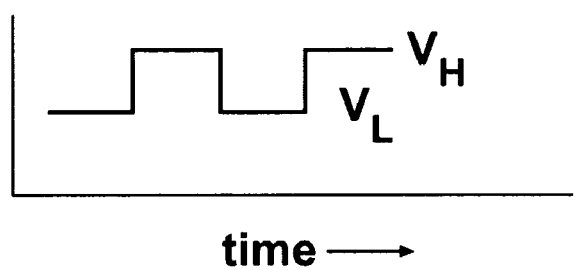
FIG. 2B is an output signal generated by the circuit shown in FIG. 2A.
Figure 3A:
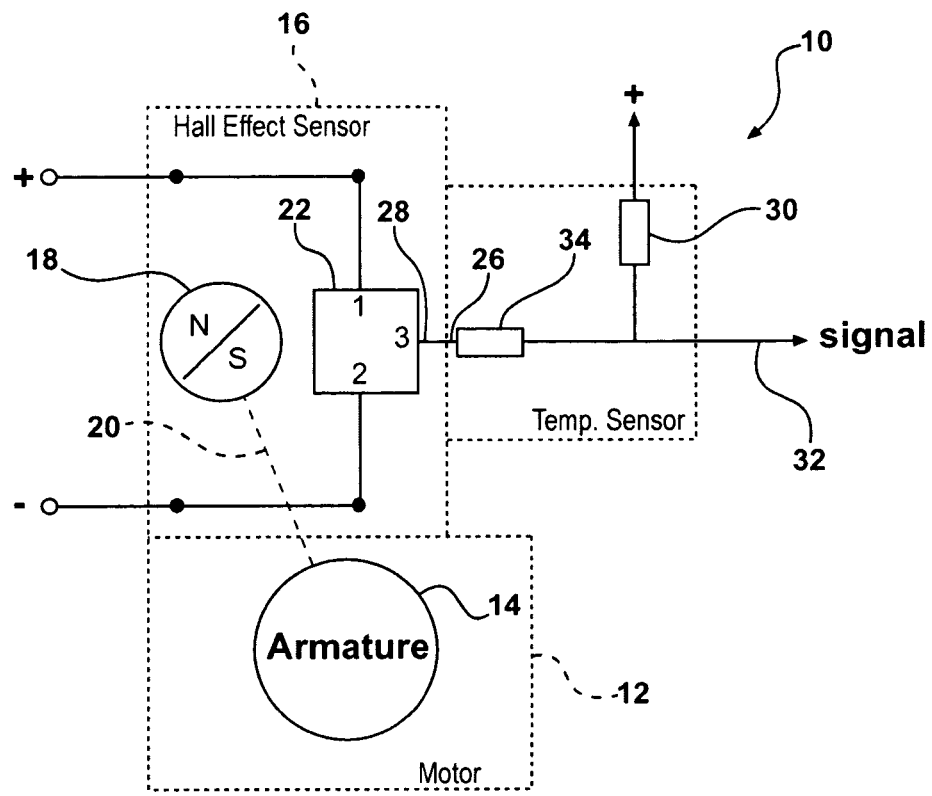
FIG. 3A is one embodiment of the invention used to measure temperature of a motor.

Referring to FIG. 3A, a schematic view of one embodiment of the invention is generally indicated at 10. The invention is a temperature sensing assembly 10. The temperature sensing assembly 10 measures the temperature of a motor 12. The motor 12 is a standard motor having an armature 14 that rotates upon receipt of an electrical current. The temperature sensing assembly 10 may be used with any type of motor 12. It is contemplated, however, that the motor 12 used in conjunction with temperature sensing assembly 10 is one that is used to selectively open and close apertures in a body of a motor vehicle (not shown).

As is typical with a motor 12, a Hall Effect sensor, generally shown at 16, is used to measure the speed and the rotational position of the armature 14. Oftentimes, it is necessary to know the rotational position of the armature 14 to identify where the part being moved by the motor 12 is with respect to another structure. This minimizes the wear and tear on the respective parts.

The Hall Effect sensor 16 includes a permanent magnet 18 that is shown to be in proximity of the armature 14 through a dashed line 20. Adjacent the permanent magnet 18 is a switch 22 that opens and closes based on the position of the permanent magnet 18. Typically, the permanent magnet 18 is mounted to the armature 14 and rotates therewith. In many situations, there are multiple permanent magnets 18 mounted to the armature 14 about its circumference equidistantly to measure fractions of rotations of the armature 14. The switch 22 is typically a transistor that opens and closes as a function of the proximity of the permanent magnet 18 thereto. More specifically, as the permanent magnet 18 passes by the transistor switch 22, the magnetic field surrounding the permanent magnet 18 affects the gate (lead 3 in the Figures) of the transistor switch 22 allowing the transistor switch 22 to change states (open or close).

Figure 3B:
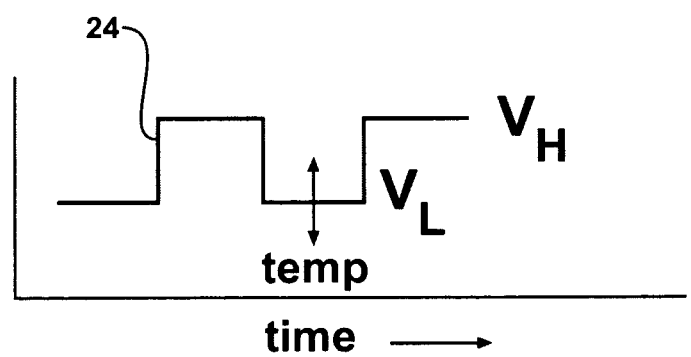
FIG. 3B is a graphic representation of the output of the circuit shown in FIG. 3A.

The output of the transistor switch 22 is a stepped output signal 24, as is shown in FIG. 3B. The temperature sensing assembly 10 includes an input 26 that is electrically connected to an output 28 of the Hall Effect sensor 16. The electrical output 28 of the Hall Effect sensor 16 is tied directly to the temperature sensing assembly 10.

The temperature sensing assembly 10 includes a pull-up resistor 30. The pull-up resistor 30 is tied to a control voltage $V_C$, represented by the positive symbol (+) in the Figures. The pull-up resistor 30 limits the amount of current that flows through the circuit when the switch 22 is open or off. In other words, when the switch 22 is open, the signal from the control voltage remains high as is represented by the high voltage in FIG. 3B, $V_H$. In this instance, $V_H$ approximates $V_C$.

When the switch 22 is closed, the output 32 of the temperature sensing assembly 10 is taken to a low state. Because the pull-up resistor 30 is between the control voltage $V_C$ and the temperature sensing assembly output 32, the system is not shorted.

The temperature sensing assembly 10 also includes a thermistor 34, which is electrically connected between the electrical output 28 of the Hall Effect sensor 16, the pull-up resistor 30, and the output 32 of the temperature sensing assembly 10. The thermistor 34 is a resistor that varies its resistance based on the temperature of the environment in which it is placed. The thermistor 34 is in series between the output 28 of the Hall Effect sensor 16 on one side and both the pull-up resistor 30 and the output 32 of the temperature sensing assembly 10 on the other side thereof. When the switch 22 is closed, and the voltage at the output 32 of the temperature sensing assembly 10 drops, it drops to a value $V_L$, wherein the lower voltage $V_L$ is calculated using the following formula:

$$V_L = V_H \times \frac{R_{THERMISTOR}}{R_{THERMISTOR} + R_{PULL-UP}}$$

Because the pull-up resistance 30 and the low voltage $V_L$ are known or measured, the resistance of the thermistor 34 can be calculated. Once the resistance of the thermistor is calculated, the temperature associated with the motor 12 may be determined based on the properties of the thermistor 34.

In operation, the method for measuring a temperature of the motor 12 using the Hall Effect sensor 16 includes the steps of identifying a high voltage value $V_H$. Once the high voltage value $V_H$ is determined, the low voltage value $V_L$ is then measured. From the identification of the high voltage value $V_H$ and the measurement of the low voltage value $V_L$, the temperature can be calculated based thereon. The temperature is calculated by measuring the value of the resistivity of the thermistor 34 by using the resistivity of the thermistor 34 and the resistance of the pull-up resistor 30, the temperature can be calculated through the known properties of the thermistor 34.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed:

1. A temperature sensing assembly for a motor having an armature, said temperature sensing assembly comprising:
    a voltage source;
    a Hall Effect sensor connected to said voltage source and disposed adjacent the armature for sensing rotation of the armature, said Hall Effect sensor including an electrical output and generating a stepped output signal;
    a thermistor connected to said electrical output in series therewith; and
    a pull-up resistor electrically connected to said thermistor and said voltage source such that said stepped output signal changes depending on the temperature of the motor due to changes in resistivity of said thermistor as it changes its resistivity as a function of temperature.

2. A temperature sensing assembly as set forth in claim 1 wherein said Hall Effect sensor includes a switch electrically connected to said electrical output for switching between an on state and an off state to generate said stepped output signal.

3. A temperature sensing assembly as set forth in claim 2 wherein said switch is a transistor.

4. A method for measuring a temperature of a motor using a Hall Effect sensor that generates a stepped output signal with a thermistor electrically connected between the Hall Effect sensor and a pull-up resistor, the method comprising the steps of:
    identifying a high voltage value of the stepped output signal;
    measuring a low voltage value of the stepped output signal; and
    calculating the temperature of the motor based on the high and low voltage values of the stepped output signal.

5. A method as set forth in claim 4 wherein the step of calculating the temperature includes the step of calculating the value of resistivity of the thermistor.

6. A method as set forth in claim 5 including the step of incorporating the resistivity of the pull-up resistor into the calculation of the resistivity of the thermistor.

7. A temperature sensing assembly for a motor having an armature, said temperature sensing assembly comprising:
    a voltage source having a first voltage and a second voltage wherein at least one of said first and second voltages has a positive voltage level;
    a Hall Effect sensor disposed adjacent the armature for sensing rotation of the armature, said Hall Effect sensor including a transistor having a drain terminal electrically connected to said first voltage, a source terminal electrically connected to said second voltage, and a gate terminal for transmitting a stepped output signal generated by said Hall Effect sensor;
    a thermistor having an output node and an input node, said input node electrically connected to said gate terminal of said transistor in series therewith; and
    a pull-up resistor electrically connected between said first voltage and said output node of said thermistor such that said stepped output signal changes depending on the temperature of the motor due to changes in resistivity of said thermistor as it changes its resistivity as a function of temperature.

* * * * *